J. A. HOUSE.
STEERING GEAR.
APPLICATION FILED APR. 18, 1922.

1,430,448.                                              Patented Sept. 26, 1922.

Inventor
J. A. House
By Watson E. Coleman
Attorney

Patented Sept. 26, 1922.

1,430,448

UNITED STATES PATENT OFFICE.

JAMES A. HOUSE, OF DYER, TENNESSEE.

STEERING GEAR.

Application filed April 18, 1922. Serial No. 554,620.

*To all whom it may concern:*

Be it known that I, JAMES A. HOUSE, a citizen of the United States, residing at Dyer, in the county of Gibson and State of Tennessee, have invented certain new and useful Improvements in Steering Gears, of which the following is a specification, reference being had to the accompanying drawings.

This invention relates to improvements in steering gears, and an important object of the invention is to provide in a device of this character improved means whereby the steering gear may be adjusted to compensate for wear in use.

A further object of the invention is to provide in combination with a steering gear, and steering post controlling the steering gear, a novel construction whereby control rods may be directed longitudinally of the steering rod and through the steering gear.

A still further object of the invention is to provide a novel and improved operating mechanism for a steering gear.

An additional object of the invention is to provide a device of this character which is simple in construction and operation, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

Figure 1:
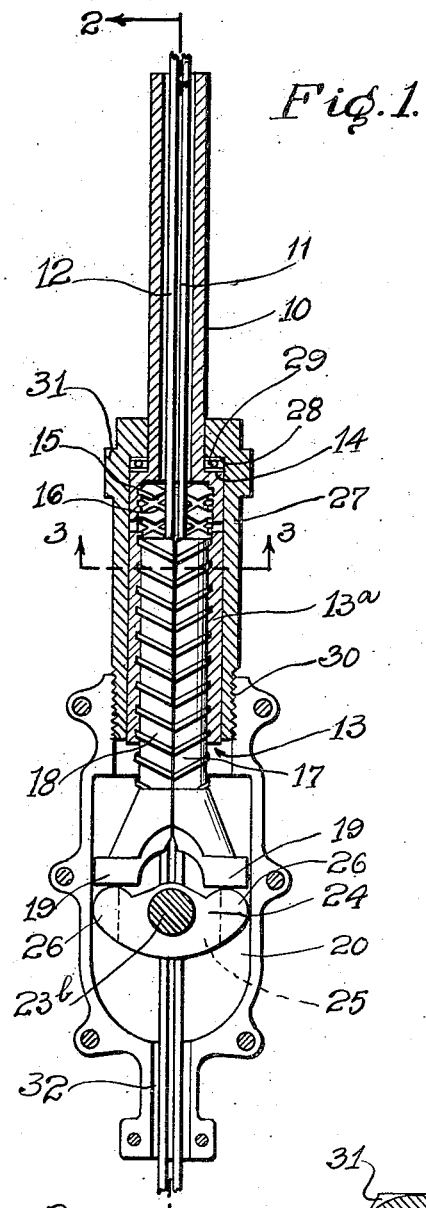
Figure 1 is a vertical sectional view taken through a steering gear constructed in accordance with my invention.
Figure 2:
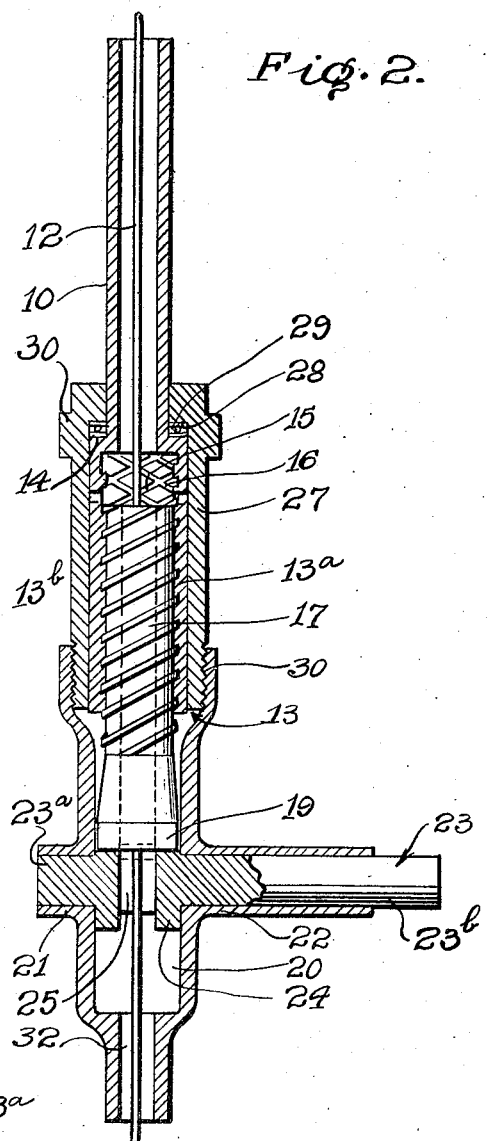
Figure 2 is a section on the line 2—2 of Figure 1.
Figure 3:
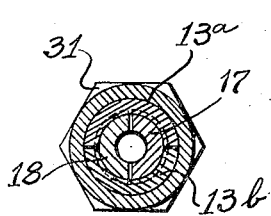
Figure 3 is a section on the line 3—3 of Figure 1.

Referring now more particularly to the drawings, the numeral 10 indicates a steering post or rod which is tubular so as to permit the passage therethrough of control rods 11 and 12 governing the carburetor and timer of an engine respectively. The steering rod is provided upon the lower end with an enlargement 13 forming upon the exterior of the steering rod an upwardly directed shoulder 14, and the bore of this enlargement is likewise enlarged and internally screw-threaded with crossed right and left hand worm threads 15 and 16 respectively, as more clearly shown in Figure 3. This enlargement in its construction is necessarily made of separate sections $13^a$ and $13^b$ which are subsequently secured together as by means of welding or in any other suitable manner. The necessity of thus forming the enlargement will hereinafter appear.

The numerals 17 and 18 designate operating sections each semi-cylindrical in form and each provided upon its exterior with worm screw threads. The threads of the section 17 are right-handed for coaction with the right-hand threads of the bore of the enlargement and the threads of the section 18 are left-hand threads for coaction with the left-handed threads thereof. The bore formed by the combination of these sections forms a continuation of the bore of the steering post for the passage of the operating rods 11 and 12. It will be seen that if the sections 17 and 18 are held against rotation and the steering post rotated, one of the sections 17 or 18 will be drawn into the bore of the enlargement and the other section will be moved toward the lower end of the bore. The arrangement of these sections is preferably such that one of the sections reaches the upper limit of its travel before the other of the sections becomes disengaged from the lower end of the bore so as to prevent the disengagement of the section by the rotation of the steering post. Each section 17 and 18 is provided upon its lower end with a tappet face 19 for a purpose presently to appear.

The numeral 20 indicates a casing provided in opposite walls thereof with bearings 21 and 22 in which are mounted for oscillation the ends of a shaft 23 comprising sections $23^a$ and $23^b$ joined by a two lobe cam member 24 having a central aperture 25 for a purpose presently to appear. The lobes 26 of the cam member 24 are each adapted for engagement by one of the tappet faces 19 of a section 17 or 18, these tappet faces being held in engagement with the lobes by means of a sleeve 27 provided at its upper end with an internal shoulder 28 opposing the shoulder 14 of the enlargement and bearing thereagainst through medium of an anti-friction bearing 29. The lower end of the sleeve 27 is externally screw-threaded for coaction with the internal screw threads 30 formed in a bore at the upper end of the casing. The side faces of the tappet members slidably engage against the wall of the casing so as to prevent their rotation. It will be seen that by rotating the sleeve 27, which is provided adjacent its upper end with a wrench receiving shoulder 31, the entire steering post assembly with the sections 17 and 18 may be moved downwardly to force the tappet faces 19 into engagement with the lobes 26 of the cam, the shaft 23 bearing the cam rotating to permit these faces to come into proper engagement. The control rods 11 and 12 pass through the central aperture 25 of the cam and through an opening 32 at the lower end of the casing and may accordingly be disposed at a position where they are easily connected with the carbureter and timer, not herein shown.

From the foregoing it is believed to be obvious that adjustment of a steering apparatus constructed in accordance with my invention is accomplished very readily and without the binding engagement commonly accompanying the adjustment of the present type of worm and pinion steering gear. In this type the threads or teeth of the worm and pinion become worn upon their respective thrust surfaces and longitudinal adjustment of the worm results in the binding of these thrust surfaces one against the other, the teeth constantly tending to flatten and causing a substantially broad surface to be brought into engagement to cause the binding. In a device constructed in accordance with my invention, the wear will fall mainly upon the tappet faces and faces of the cam lobes, and this wear may be readily compensated by simply shifting the steering post longitudinally. The wear of the threads of the sections upon the internal surface of the bore of the enlargement will be substantially small, due to the fact that these threads have a substantial bearing surface in the bore and the wear is accordingly very evenly distributed. Furthermore, by the construction illustrated the employment of square threads is rendered possible and these threads will wear much more evenly than the ordinary worm threads employed in steering gears. It will likewise be obvious that the construction hereinbefore set forth is capable of some change and modification without materially departing from the spirit of my invention and I accordingly do not limit myself thereto except as hereinafter claimed.

I claim:

1. In a steering gear, a steering post provided in its lower end with a bore, a pair of sleeve sections mounted within the bore and each provided at its lower end with a tappet face, means connecting the steering post and sections whereby rotation of the steering post causes longitudinal movement of the sections in opposite directions, and a shaft having portions engaged by the tappet faces of said sections.

2. In a steering gear, a steering post provided in its lower end with a bore, a pair of sleeve sections mounted within the bore and each provided at its lower end with a tappet face, means connecting the steering post and sections whereby rotation of the steering post causes longitudinal movement of the sections in opposite directions, a shaft having portions engaged by the tappet faces of said sections, and means for adjusting said steering post upon its longitudinal axis.

3. In a steering gear, a steering post provided in its lower end with a bore, a pair of sleeve sections mounted within the bore and each provided at its lower end with a tappet face, means connecting the steering post and sections whereby rotation of the steering post causes longitudinal movement of the sections in opposite directions, a shaft having portions engaged by the tappet faces of said sections, and means for adjusting said steering post upon its longitudinal axis, the upper end of said bore limiting the travel of each of said sleeve sections in one direction.

4. In a steering gear, a hollow steering post provided at its lower end with an enlarged bore, said bore being provided with oppositely directed screw threads, a pair of semi-cylindrical sleeve sections disposed within the bore and oppositely threaded for engagement with the threads of the bore, a cam embodying a pair of lobes one of which is arranged in the path of movement of each of said sleeve sections, and a rotatably mounted shaft to which the cam is secured.

5. In a steering gear, a hollow steering post provided at its lower end with an enlarged bore, said bore being provided with oppositely directed screw threads, a pair of semi-cylindrical sleeve sections disposed within the bore and oppositely threaded for engagement with the threads of the bore, a cam embodying a pair of lobes one of which is arranged in the path of movement of each of said sleeve sections, and a rotatably mounted shaft to which the cam is secured, said cam being provided with an aperture aligning with the bore of the steering post.

6. In a steering gear, a tubular steering post provided at its lower end with an enlargement, the enlargement having a bore, said bore having its walls oppositely screw-threaded, a pair of semi-cylindrical sleeve sections within the bore and oppositely screw-threaded for coaction with the threaded walls thereof, said sleeves combining to form a continuation of the bore of the steering post, a cam arranged in the path of movement of the sleeve sections and provided with lobes adapted for engagement by said sleeve sections, and a shaft to which the cam is secured, said cam being provided with an aperture aligning with the bore of the steering post.

7. In a steering gear, a tubular steering post provided at its lower end with an enlargement, the enlargement having a bore, said bore having its walls oppositely screw-threaded, a pair of semi-cylindrical sleeve sections within the bore and oppositely screw-threaded for coaction with the threaded walls thereof, said sleeves combining to form a continuation of the bore of the steering post, a cam arranged in the path of movement of the sleeve sections and provided with lobes adapted for engagement by said sleeve sections, a shaft to which the cam is secured, said cam being provided with an aperture aligning with the bore of the steering post, a bearing for said shaft, a casing supporting the bearing, a sleeve surrounding the enlarged portion of the steering post and provided at its upper end with a shoulder engaging the upper end of the enlargement thereof, and a threaded connection between the opposite end of the sleeve and the casing.

8. In a steering gear, a tubular steering post provided at its lower end with an enlargement, the enlargement having a bore, said bore having its walls oppositely screw-threaded, a pair of semi-cylindrical sleeve sections within the bore and oppositely screw-threaded for coaction with the threaded walls thereof, said sleeves combining to form a continuation of the bore of the steering post, a cam arranged in the path of movement of the sleeve sections and provided with lobes adapted for engagement by said sleeve sections, a shaft to which the cam is secured, said cam being provided with an aperture aligning with the bore of the steering post, a bearing for said shaft, a casing supporting the bearing, a sleeve surrounding the enlarged portion of the steering post and provided at its upper end with a shoulder engaging the upper end of the enlargement thereof, and a threaded connection between the opposite end of the sleeve and the casing, said casing being provided at the end thereof remote from the point of entrance of the steering post with an aperture aligning with the bore of the steering post.

In testimony whereof I hereunto affix my signature.

JAMES A. HOUSE.